United States Patent [19]

Sharma et al.

[11] Patent Number: 5,761,736
[45] Date of Patent: Jun. 2, 1998

[54] APPARATUS AND METHOD FOR IMPLEMENTING MULTIPLE SCALED STATES IN A STATE MACHINE

[75] Inventors: Puneet Sharma, San Jose; John Gregory Favor, Scotts Valley, both of Calif.

[73] Assignee: Advanced Micro Devices, Inc., Austin, Tex.

[21] Appl. No.: 648,711

[22] Filed: May 16, 1996

[51] Int. Cl.$^6$ ................................................. G06F 13/00
[52] U.S. Cl. ............................................ 711/167; 711/169
[58] Field of Search ................................. 711/167, 168, 711/169

[56] References Cited

U.S. PATENT DOCUMENTS

| | | | |
|---|---|---|---|
| 5,418,924 | 5/1995 | Dresser | 711/167 |
| 5,551,010 | 8/1996 | Iino | 711/169 |
| 5,557,782 | 9/1996 | Witkowski | 711/167 |
| 5,566,325 | 10/1996 | Bruce, II et al. | 711/167 |
| 5,596,741 | 1/1997 | Thome | 711/163 |
| 5,636,367 | 6/1997 | Stones | 711/167 |

*Primary Examiner*—Eric Coleman
*Attorney, Agent, or Firm*—Skjerven, Morrill, MacPherson, Franklin & Friel LLP; Forrest E. Gunnison; Omkar K. Suryadevara

[57] ABSTRACT

A state machine has states of three types: a fully scaled state, a partially scaled state and an unscaled state. The state machine (1) waits in the unscaled state for a minimum duration, (2) waits in the fully scaled state for a maximum duration that is a multiple of the minimum duration, and (3) waits in the partially scaled state for a duration smaller than the maximum duration but no smaller than the minimum duration. The state machine is included in a microprocessor chip, and is used to access an off-chip cache coupled to the microprocessor chip. The minimum and maximum durations are inverse of the respective clock frequencies of the microprocessor chip and of the off-chip cache. During a read access operation, the state machine waits in a partially scaled state while driving address signals of a to-be-retrieved word on an external bus coupled to the off-chip cache. Thereafter, the state machine waits in the fully scaled state on the external bus to access data signals driven by the off-chip cache to indicate the retrieved word. So, the state machine saves time by using the partially scaled state to set up address signals for a duration less than the maximum duration. Similarly, during a write access operation, the state machine also uses the partially scaled state to drive address signals and data signals of a to-be-written word to the off-chip cache.

10 Claims, 12 Drawing Sheets

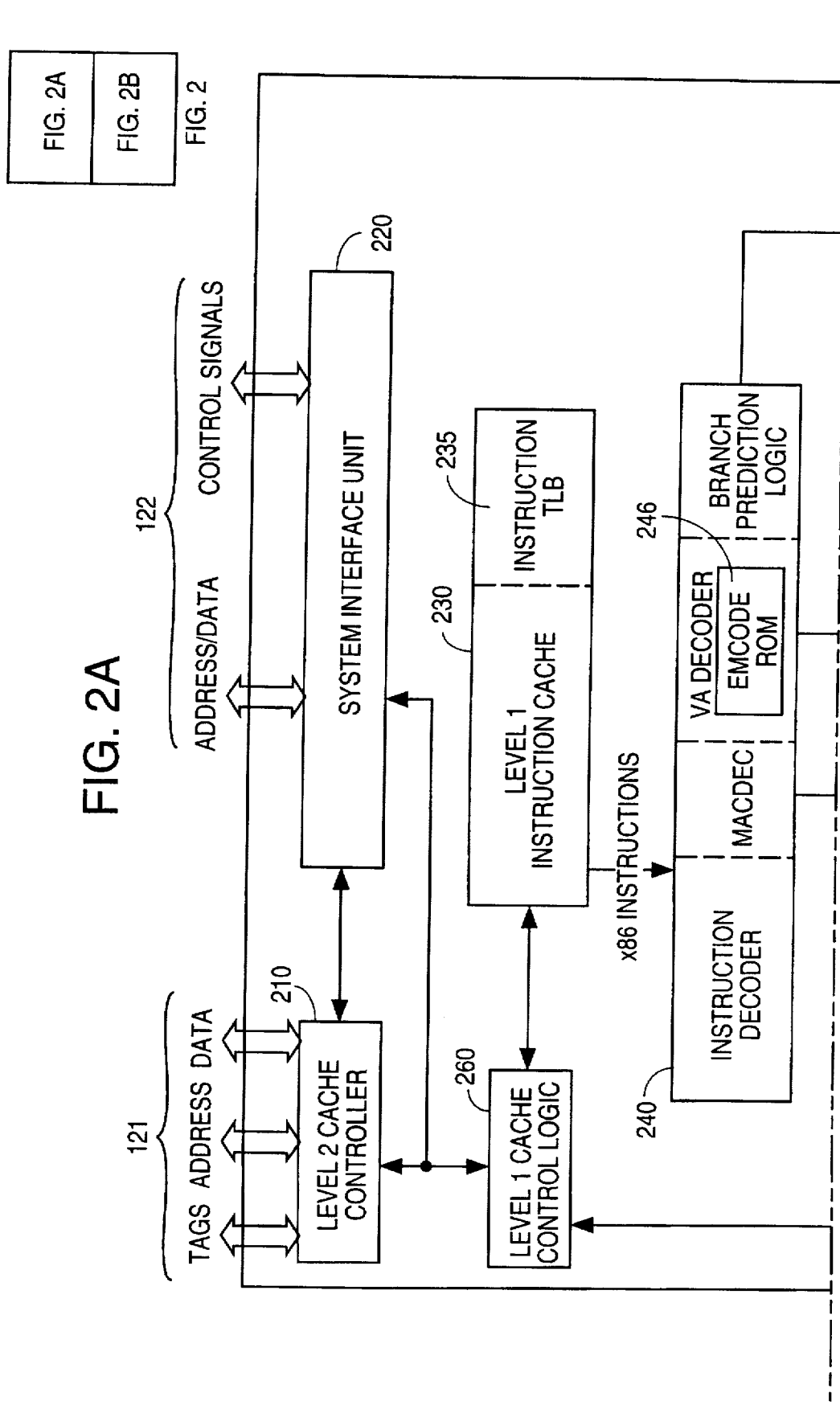

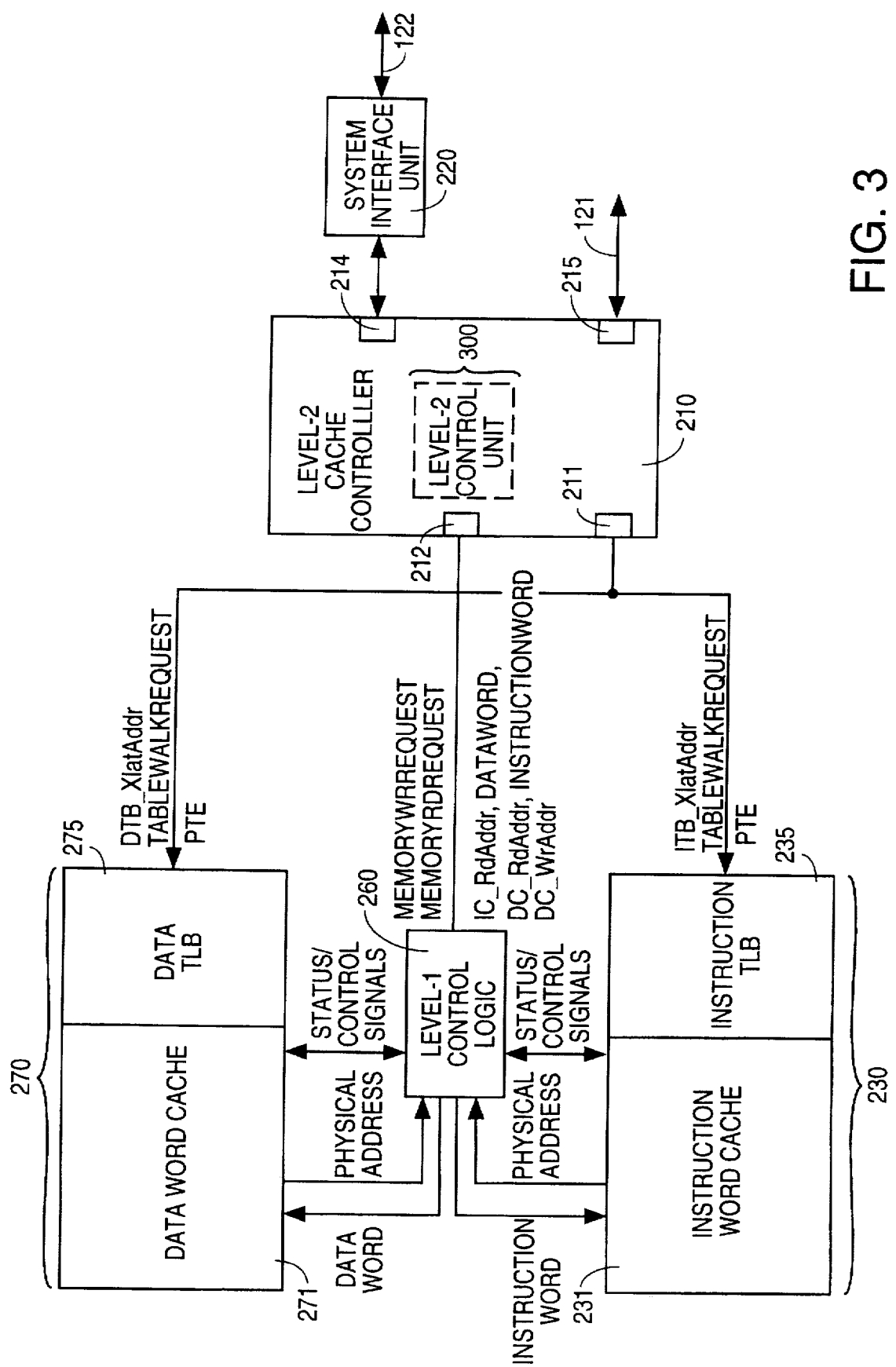

APPARATUS AND METHOD FOR IMPLEMENTING MULTIPLE SCALED STATES IN A STATE MACHINE

CROSS REFERENCE TO RELATED APPLICATIONS

This application is related to and incorporates by reference in its entirety, the copending, concurrently filed and commonly owned U.S. Pat. application Ser. No. 08/649,243, entitled "UNIFIED MULTI-FUNCTION OPERATION SCHEDULE FOR OUT-OF-ORDER EXECUTION IN A SUPERSCALAR PROCESSOR" by John G. Favor et al. that is a continuation of U.S. Pat. application Ser. No. 08/590,383 filed Jan. 26, 1996.

This application is also related to and incorporates by reference in its entirety, the copending, concurrently filed and commonly owned U.S. Pat. application Ser. No. 08/649, 847, entitled "A CACHE CONTROLLER WITH TABLE WALK LOGIC TIGHTLY COUPLED TO SECOND LEVEL ACCESS LOGIC" by Puneet Sharma and John G. Favor.

FIELD OF THE INVENTION

This invention relates to an integrated circuit having a state machine with at least three types of states (called "scaled states"), wherein in each scaled state the state machine waits for a duration different from the duration in another scaled state.

BACKGROUND OF THE INVENTION

Computer systems having a central processing unit (CPU) and memory for storing instructions and data are well known. A typical computer system can have many types of memory that together form a hierarchy, wherein a memory's capacity increases, and speed and cost decrease as one moves down the hierarchy. A cache is a relatively fast, small memory that is used to provide local storage for frequently accessed locations of a larger, relatively slow, main memory. Main memory in turn is relatively faster, smaller and more expensive than magnetic disks or magnetic tape.

A central processing unit (CPU) typically uses an address to reference words in memory. The CPU drives address signals and waits for a response from memory. If a word is present in a cache inside an integrated circuit that contains the CPU, the word is usually available at the same speed as the clock frequency of the CPU. If a word is not present in such a cache, the word must be retrieved from an off-chip cache or eventually from main memory or magnetic disk, thereby to cause the CPU to wait for the retrieval.

The duration of a CPU's wait for such retrieval of a word from an off-chip cache includes an address setup duration and a data access duration. In the address setup duration, the CPU drives the to-be-retrieved word's address signals on an external bus coupled to the off-chip cache. In the data access duration, the CPU waits for the off-chip cache to drive data signals of the retrieved word on the external bus. The address setup duration and the data access duration are both inverse of the clock frequency of a synchronous random-access-memory (RAM) used as the off-chip cache, typically, two times the CPU's clock period. In this example, the CPU normally waits for a total of four CPU clock periods to retrieve a word from an off-chip cache, and for two CPU clock periods to write a word to the off-chip cache.

SUMMARY OF THE INVENTION

A scaled state machine in an integrated circuit in accordance with this invention has at least three types of states, called "scaled states", wherein in each scaled state the state machine waits for a duration that is different from the duration in another scaled state. For example, a scaled state machine can have a first scaled state, a second scaled state and an nth scaled state, wherein the scaled state machine: (1) waits in the first scaled state for a minimum duration, (2) waits in the nth scaled state for a maximum duration, and (3) waits in the second scaled state for a duration smaller than the maximum duration but no smaller than the minimum duration.

In one embodiment, the integrated circuit is a microprocessor chip that is coupled to an off-chip cache. In this embodiment, the minimum duration is inverse of a clock frequency of the microprocessor chip, and the maximum duration is inverse of a clock frequency of the off-chip cache. The maximum duration can be a multiple of the minimum duration, depending on the relative frequencies of the microprocessor chip and the off-chip cache.

The microprocessor chip uses a scaled state machine (also referred to as a "partially scaled state machine") having an "unscaled" state as the first scaled state, a "partially scaled" state as the second scaled state and a "fully scaled" state as the nth scaled state. The partially scaled state machine waits in the unscaled state for a request signal, such as a read access operation for retrieval of a word from the off-chip cache.

During a read access operation, the partially scaled state machine waits in a partially scaled state while driving address signals of the to-be-retrieved word on an external bus coupled to the off-chip cache. Thereafter, the partially scaled state machine waits in the fully scaled state on the external bus to access data signals driven by the off-chip cache and indicative of the retrieved word.

So, the partially scaled state machine sets up an address in the partially scaled state for a duration (henceforth "address setup duration") less than the maximum duration, and accesses data in the fully scaled state for a duration (henceforth "data access duration") equal to the maximum duration. As the partially scaled state machine's address setup duration is less than its data access duration, the partially scaled state machine requires less time for a read access operation than a conventional state machine. As noted above, a conventional state machine's setup duration is equal to its data access duration.

During a write access operation, the partially scaled state machine also uses the partially scaled state to drive address signals and data signals of a to-be-written word to the off-chip cache. Time savings by use of the partially scaled state machine become significant when performing read and write access operations on an off-chip cache a large number of times in a short time period e.g. due to misses in the on-chip cache for a number of words successively. Such time savings are also significant, for example, during checking for the presence of noncacheable words in the off-chip cache, and such checking is necessary in case a cacheable word was changed to noncacheable.

Although the partially scaled state machine is described herein for operations to access an off-chip cache, such a partially scaled state machine can be used to perform any other operation that requires waits of different durations in different states, such as operations to access main memory, or operations to access a peripheral device, such as a magnetic disk or a network device. Also, the maximum scale used in the partially scaled state machine can be changed to allow access to peripheral devices that have significantly different maximum scales. For example, the maximum scale that is needed to access a specific peripheral device can be loaded into a scale register, described below, just prior to accessing the device.

In one particular embodiment, the partially scaled state machine has an input line (also referred to as "holdstate line") and a number of output terminals, including at least two nextscale output terminals and a number of bus terminals coupled to an off-chip cache. On entering a scaled state (also called "current scaled state"), the partially scaled state machine drives on the nextscale output terminals a nextscale signal indicative of the scaled state to be entered on exiting the current scaled state.

In this embodiment, the partially scaled state machine transitions to the next state at the next clock cycle only if a signal (also referred to as a "holdstate signal") is inactive on the holdstate line. If the holdstate signal is active, then at the next clock cycle the partially scaled state machine stays in the current state. Therefore, the holdstate signal must be active or inactive as appropriate at least within the last cycle of the current scaled state.

In this particular embodiment, the microprocessor chip includes a state duration controller having a number of input lines, including a maxscale input line that is coupled to a scale register, and at least two nextscale input lines that are coupled to the nextscale output terminals. In addition, the state duration controller has an output terminal (also referred to as a "holdstate output terminal") that is coupled to the holdstate line.

At start up, the state duration controller uses a signal on the maxscale input line to select a set of durations corresponding to the scaled state signals receivable on the nextscale input lines. The state duration controller uses the selected set to determine a specific duration corresponding to a scaled state signal received on the nextscale input lines. On completion of the current scaled state, the state duration controller drives a signal active on the holdstate output terminal for the specific duration.

For example, in a partially scaled state machine with three states, if the maxscale input line indicates a maximum scale of three for a microprocessor chip thrice as fast as the off-chip cache, the state duration controller drives the holdstate signal active for (1) one clock period for the partially scaled state (2) two clock periods for the fully scaled state, and (3) does not drive the holdstate signal for the unscaled state.

Therefore, in the above example, the partially scaled state machine waits for a total of five clock periods (two in a partially scaled state and three in a fully scaled state) to perform a read access operation to an off-chip cache, as compared to a total of six clock periods for a conventional state machine. Also in this example, the partially scaled state machine waits for only two clock periods to directly write a word into an off-chip cache, as compared to three clock periods for a conventional state machine.

Although a partially scaled state machine has been described herein as having three types of states including a partially scaled state, another embodiment of the state machine has only unscaled states and fully scaled states.

BRIEF DESCRIPTION OF THE DRAWINGS

FIG. 3 illustrates, in a high level block diagram, the connections between a second level cache controller, a system interface unit and other components of the computer system illustrated in FIG. 2.

Use of the same reference numerals in different figures indicates similar or identical items.

DETAILED DESCRIPTION

According to the invention, a state machine has at least three scaled states, wherein in each scaled state the state machine waits for a duration that is different from the duration in another scaled state. One embodiment of the state machine (hereinafter "partially scaled state machine") is implemented in a microprocessor to access an off-chip cache coupled to the microprocessor.

The partially scaled state machine, as described more completely below, has a fully scaled state, a partially scaled state and an unscaled state, and (1) waits in the unscaled state for a first duration that is inverse of the processor's clock frequency, (2) waits in the fully scaled state for a second duration that is inverse of the off-chip cache's clock frequency, and (3) waits in the partially scaled state for a duration smaller than the second duration but no smaller than the first duration.

For a read access operation, the partially scaled state machine waits in a partially scaled state while driving address signals of a to-be-retrieved word to the off-chip cache. Thereafter, the partially scaled state machine waits in a fully scaled state to access data signals driven by the off-chip cache, and indicative of the retrieved word. For a write access operation, the partially scaled state machine waits in a partially scaled state while driving address signals and data signals of a to-be-written word to the off-chip cache.

Figure 1:
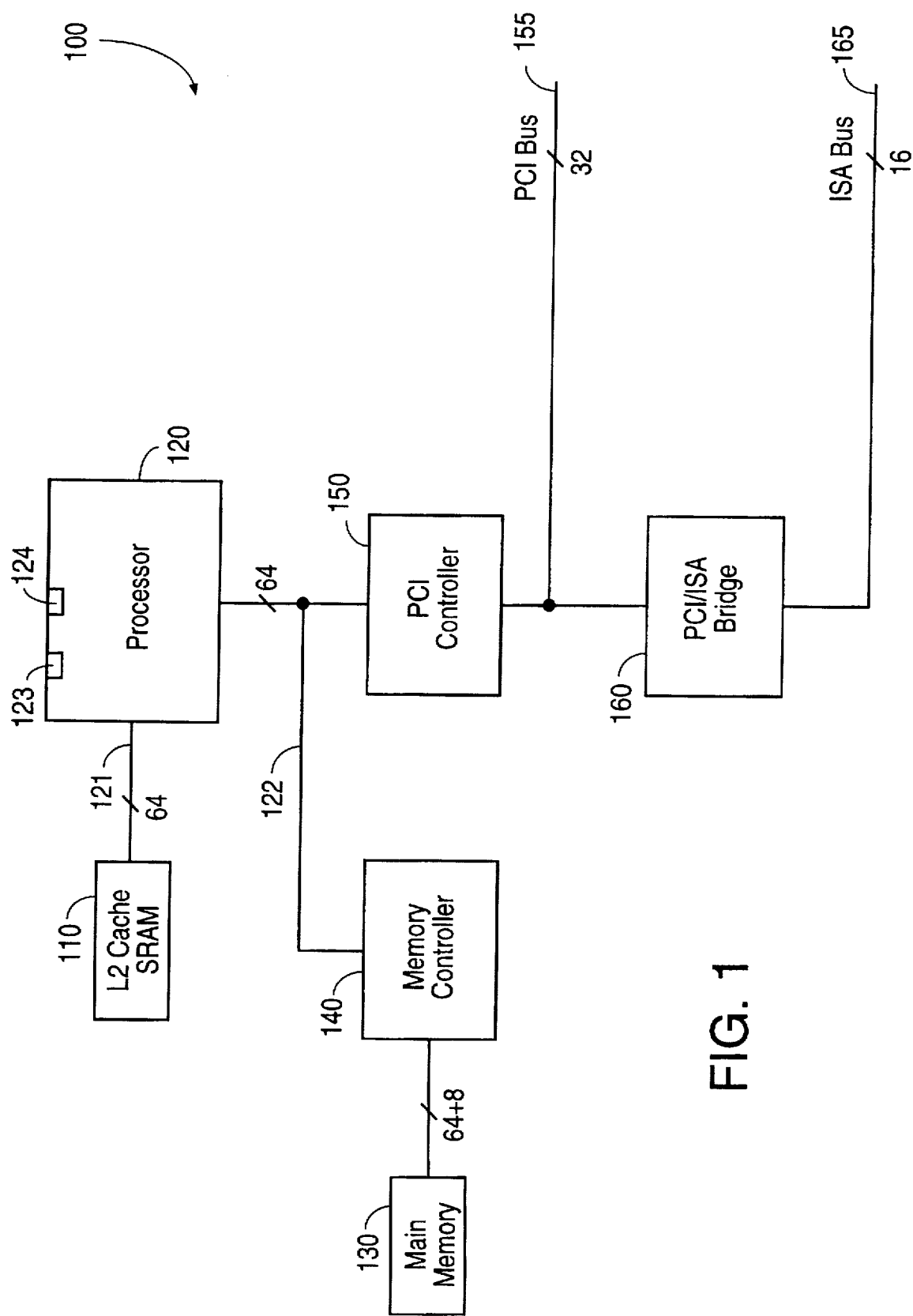
FIG. 1 shows a block diagram of a computer system including a processor in accordance with an embodiment of the invention.
Figure 2B:
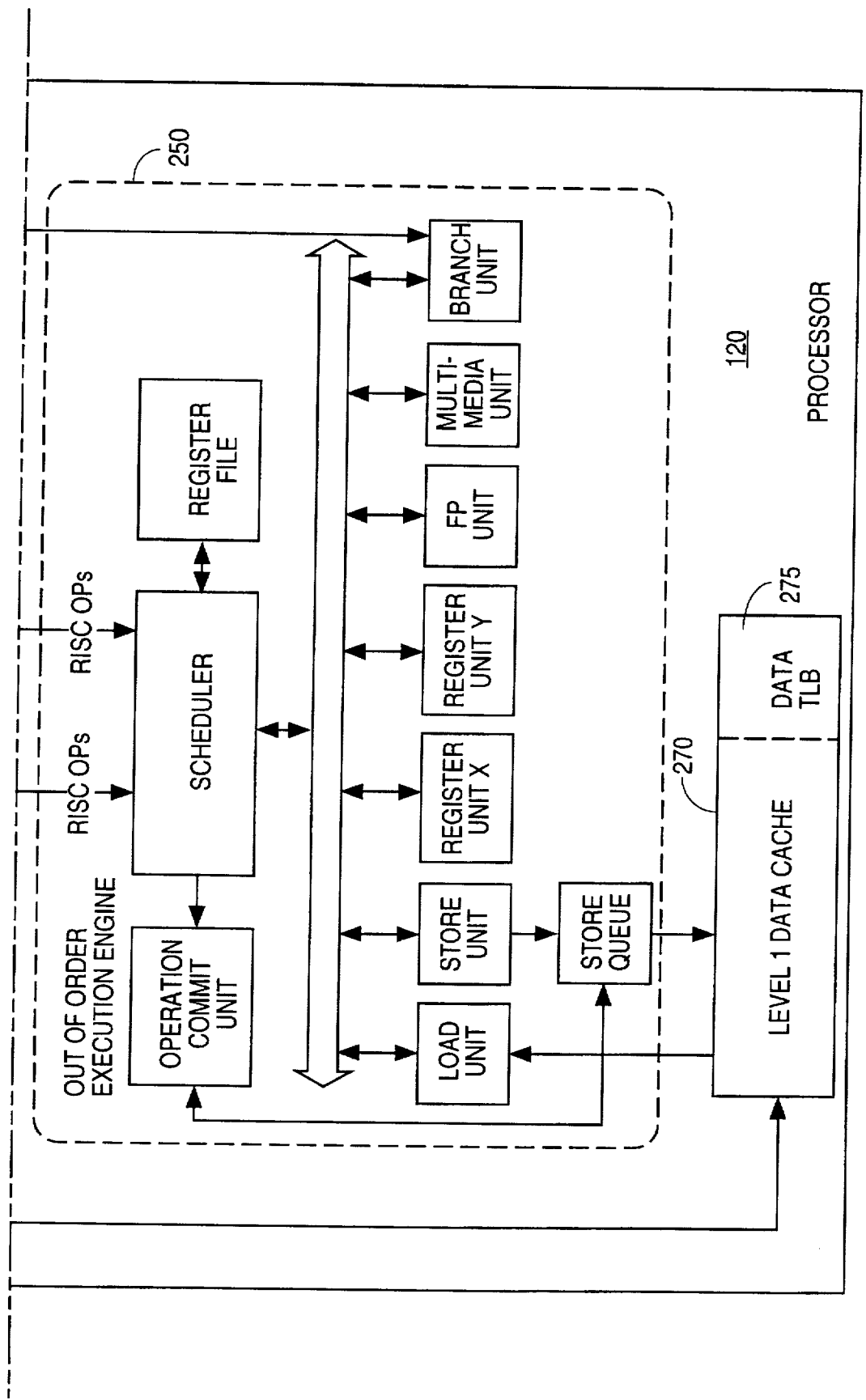
FIG. 2 shows a processor in accordance with an embodiment of the invention.

In a computer system 100 (FIG. 1), a processor 120 in one embodiment of the invention is a monolithic integrated circuit capable of executing a complex instruction set, and may be manufactured using conventional integrated circuit processes, such as a five layer metal CMOS process having 0.35 µm design rules. In this embodiment, processor 120 is connected to an external second level cache 110, to a memory controller 140 that is connected to main memory 130, and to bus controllers 150 and 160 that are connected to buses, such as a PCI bus 155 and an ISA bus 165. Processor 120 (FIG. 2) has a system interface unit 220 that provides access to devices in the address space of computer system 100, including access to main memory 130 and peripheral devices on busses 155 and 165. A level-2 cache controller 210 in processor 120 is coupled through a level-2 bus 121 to an external SRAM which forms the level-2 cache 110 (FIG. 1).

In the enclosed description, the terms "second level", "level-2" and "L2" are used interchangeably, e.g. a "second level" cache is identical to a "level-2 cache" or a "L2 cache." Similarly, the terms "first level", "level-1" and "L1" are used interchangeably.

Processor 120 of this embodiment includes a first level cache formed by an instruction cache 230, (FIG. 3) and a data cache 270 that are both coupled through a level-1 control logic 260 to level-2 cache controller 210 and to system interface unit 220. Although in FIG. 3, level-1 control logic 260 is illustrated as a single unit, in another embodiment, two different level-1 control logics, namely a data control logic and an instruction control logic are used. Such a data control logic and an instruction control logic operate independent of each other, and level-2 cache controller 210 maintains cache coherency and mutual exclusion between data cache 270 and instruction cache 230.

In one embodiment, instruction cache 230 has storage locations that form an instruction word cache 231 for caching instructions that are executed by processor 120, and also has storage locations that form an instruction translation lookaside buffer 235, hereinafter "instruction TLB" 235. Instruction TLB 235 holds table entries used in translation of virtual addresses of the instructions. Similarly, data cache 270 has storage locations that form a data word cache 271 for caching data operands used by processor 120, and also has storage locations that form a data TLB 275 for holding table entries used in translation of virtual addresses of the data operands.

In an exemplary embodiment, instruction cache 230 includes a 16 KB two-way set-associative cache as instruction word cache 231 and a 64 entry cache (approximately 1KB) as instruction TLB 236. In this exemplary embodiment, data cache 270 includes a 32 KB two-way set-associative cache as data word cache 271 and a 128 entry cache (approximately 2KB) as data TLB 275. In an alternative embodiment, instruction cache 230 and data cache 270 are direct mapped caches, wherein each cache line contains one of a number of words of main memory 130. All words storable in a cache line in either of these two embodiments have the same low order address bits (e.g. bits 13:3), with the number of bits (e.g. eleven bits) depending on the size of the cache. Moreover, in the exemplary embodiment, second level cache 110 is a direct mapped cache.

In one specific embodiment, the two word caches, 231 and 271, and the two TLBs 235 and 275 together form four storage components of computer system 100. Any one of the four storage components 231, 271, 235, 275 can drive a control request signal to level-2 cache controller 210, e.g. if a word is not found in a cache, or if an entry is not found in a TLB. Processor 120 includes a number of other components, such as execution engine 250 and instruction decoder 240, that are not significant aspects of the invention.

Level-2 cache controller 210 (FIG. 3) has a number of TLB terminals 211 that are coupled to data TLB 275 and instruction TLB 235, a number of level-1 terminals 212 that are coupled to level-1 control logic 260, a number of system terminals 214 that are coupled to system interface unit 220. Level-2 cache controller 210 also has, in this embodiment, a number of cache terminals 215 that are coupled to level-2 bus 121. Level-2 bus 121 includes a number of address lines, data lines, tag lines and at least two control lines, namely an output enable line and a write enable line for a static random access memory (SRAM). If L2 bus 121 is coupled to a number of chips, then L2 bus 121 can also include additional control lines for chip select signals generated from address signals otherwise normally passed to the address lines in L2 bus 121.

Level-2 cache controller 210 includes a level-2 control unit 300 (FIG. 3) for performing an access operation, e.g. read or write a word to level-2 cache 110 (FIG. 1) and to main memory 130. Specifically, in response to an access request signal on a level-1 terminal 212 (FIG. 3), e.g. write request signal MEMORYWRREQUEST or read request signal MEMORYRDREQUEST from data word cache 271, or read request signal MEMORYRDREQUEST from instruction word cache 231, level-2 cache controller 210 uses level-2 control unit 300 to perform the necessary access to level-2 cache 110 if present. Level-2 cache controller 210 also performs an access to main memory 130 either if level-2 cache 110 is not present or if the necessary word is not found in level-2 cache 110.

Moreover, in response to an active request signal e.g. translate request signal TABLEWALKREQUEST from data TLB 275 (or from instruction TLB 235), level-2 cache controller 210 uses level-2 control unit 300 to combine the respective portion of the virtual address signal e.g. signal DTB_XlatAddr (or signal ITB_XlatAddr) with a value from a register e.g. register CR3 (FIG. 7) and perform a table look-up, as described below.

Figure 4A:
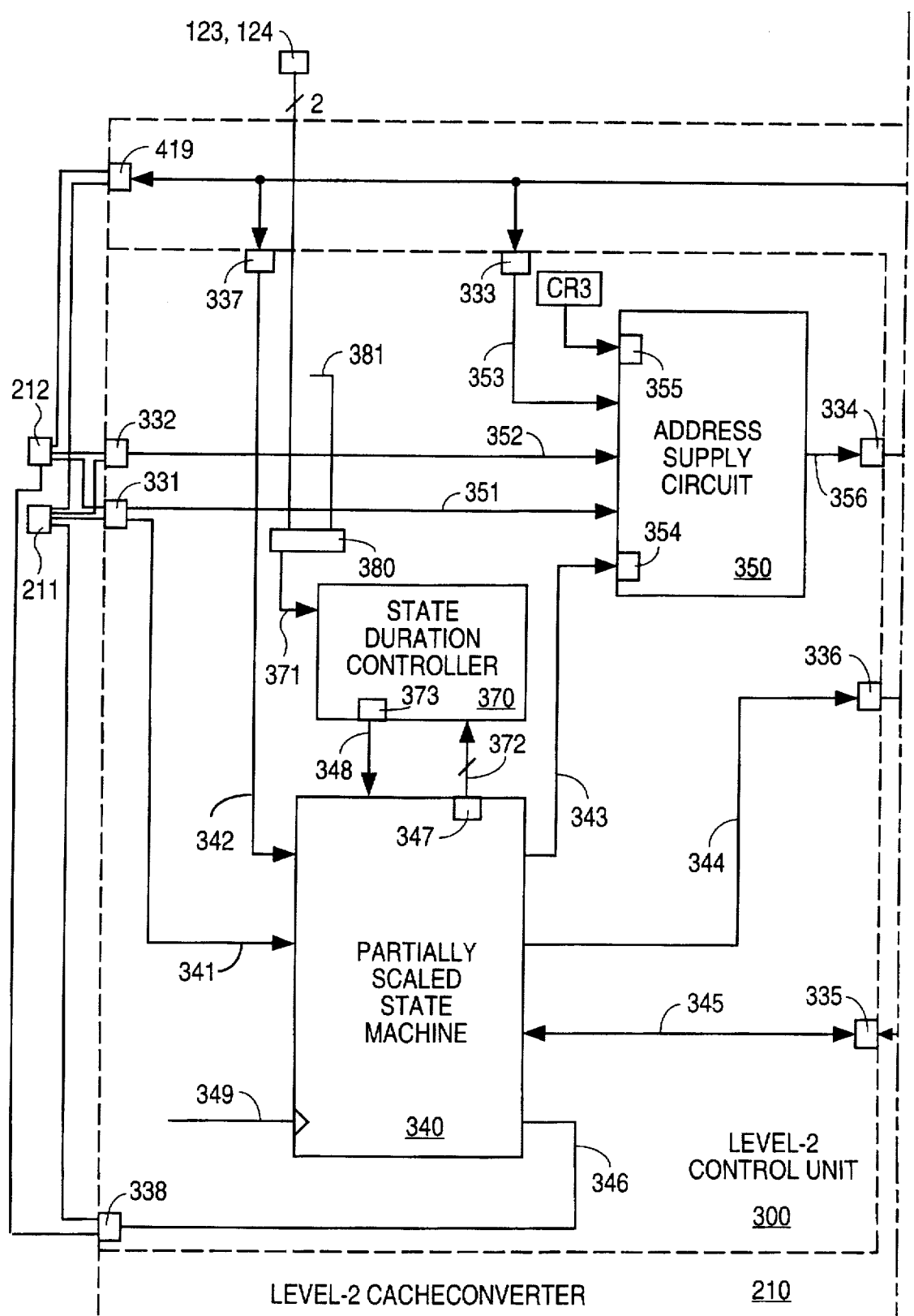
FIG. 4 illustrates in an intermediate level block diagram, the second level cache controller of FIG. 3.
Figure 4B:
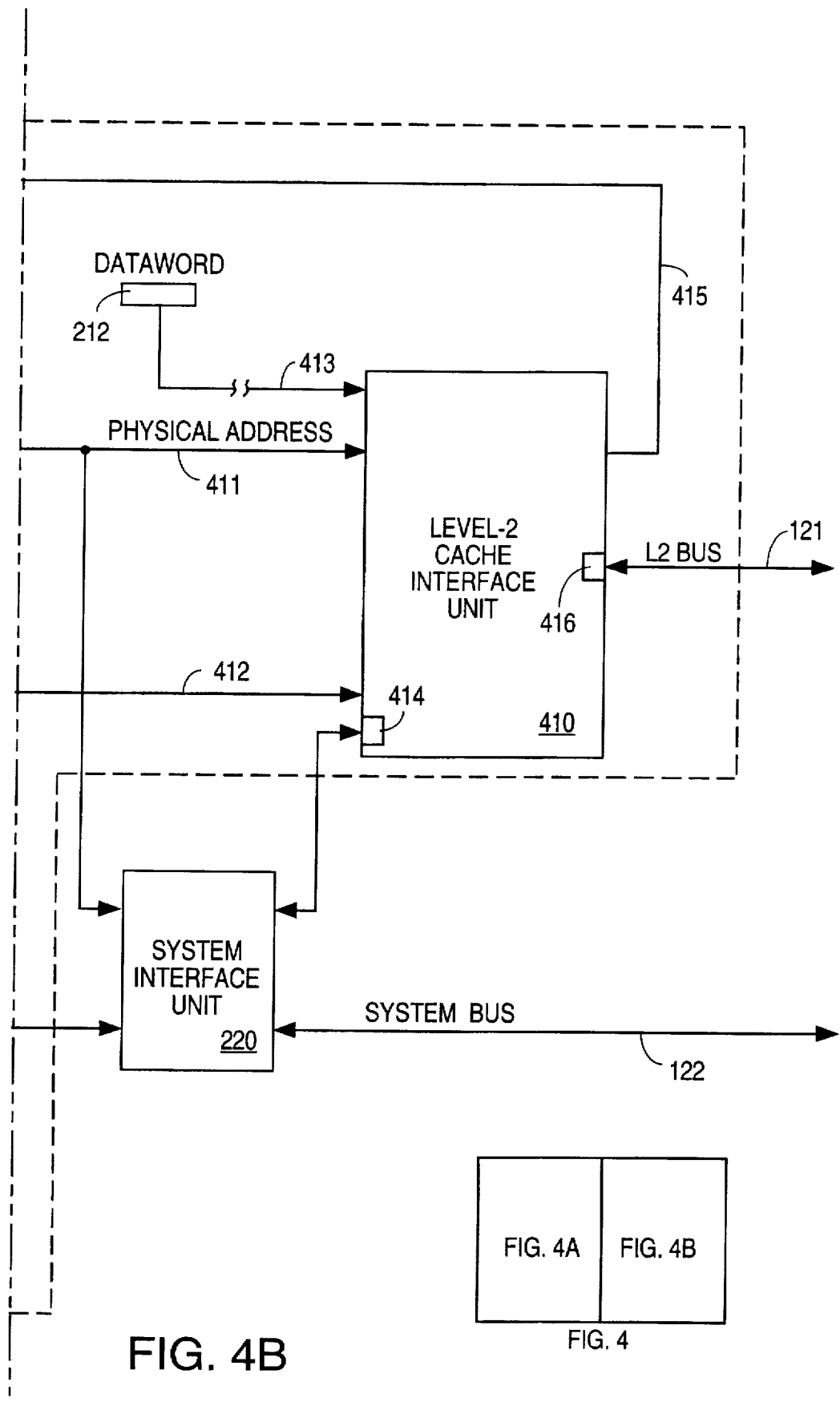

TLB terminals 211 and level-1 terminals 212 are coupled to a number of control request terminals 331 (FIG. 4) and address input terminals 332 of level-2 control unit 300. Level-2 control unit 300 also has a number of physical address terminals 334 that are used to address a location in memory e.g. level-2 cache 110 and main memory 130 (FIG. 1), and a number of table entry terminals 333 that are used to receive a word from an addressed memory location. Moreover, level-2 control unit 300 has one or more system control terminals 335 that are coupled to system interface unit 220. Level-2 control unit 300 of this embodiment also has one or more cache control terminals 336 and one or more cache status terminals 337 that are coupled to a level-2 cache interface unit 320 also included in level-2 cache controller 210.

Physical address terminals 334 are coupled to physical address lines 411 (FIG. 4) of a level-2 cache interface unit 410 that is also included in level-2 cache controller 210. Level-2 cache interface unit 410 passes a physical address signal received on physical address lines 411 to cache bus terminals 416 that are coupled to L2 bus 121, in response to an active signal on a cache control line 412 that is coupled to cache control terminal 336.

Level-2 cache interface unit 410 performs operations without regard to the origin of an address signal, i.e. irrespective of whether an address signal on physical address lines 411 was created by address supply circuit 350, or was received from data word cache 271 or instruction word cache 231. In case of a write access operation, level-2 cache interface unit 410 passes a data word signal DATAWORD received on write data lines 413 to cache bus terminals 416.

Moreover, in case of a read operation, level-2 cache interface unit 410 supplies a data word signal DATAWORD received on cache bus terminals 416 onto cache output lines 415 that are coupled to table entry terminals 333, e.g. so that address supply circuit 350 can receive a page directory entry needed to compute the address of a page table entry.

Figure 5A:
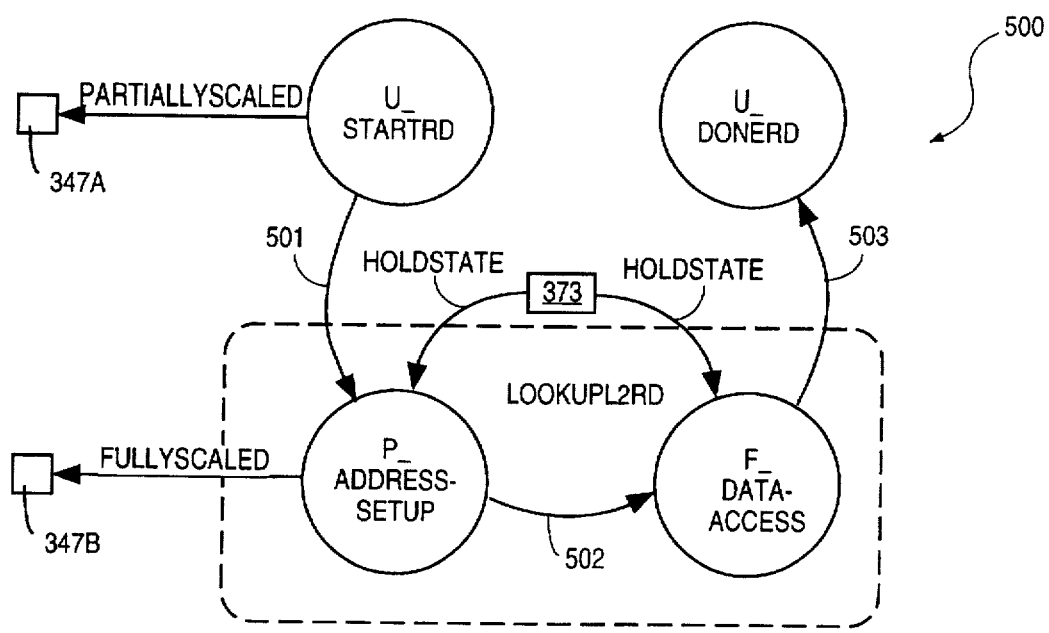
FIGS. 5A and 5B illustrate certain states and related transitions of the partially scaled state machine of FIG. 4 that implements the level-2 control unit of FIG. 3.

Level-2 cache interface unit 410 also checks for privilege violations while accessing a memory location indicated by the address signal on physical address lines 411, and passes a status signal e.g. signal ACCESSVIOLATION (FIG. 5) on a cache output line 415 (FIG. 4) that is coupled to a cache status terminal 337 of level-2 control unit 300.

Level-2 cache interface unit 410 also has a number of system interface terminals 414 that are coupled to system interface unit 220. If an addressed word cannot be found in second level cache 110 (FIG. 1) coupled to level-2 bus 121, level-2 cache interface unit 410 (FIG. 4) passes the address signal from physical address lines 411 onto the system interface terminals 414 to access the addressed location from main memory 130.

In one specific embodiment, level-2 control unit 300 includes a state machine 340 (FIG. 4), also referred to as partially scaled state machine 340. State machine 340 has a number of control request lines 341 that are coupled to the respective control request terminals 331. State machine 40 processes request signals active on control request lines 341 by transitioning through a number of states.

State machine 340 has three types of states namely: an unscaled state, a partially scaled state and a fully scaled state. State machine 340 waits in each scaled state for a duration that is different from the duration in another scaled state, to take into account the "slowness" of L2 cache 110. Unscaled states in state machine 340 operate at the clock frequency of processor 120 and include states that are independent of off-chip cache accesses.

Fully scaled states in state machine 340 include states that require waiting for a response from an off-chip cache, e.g. L2 cache 110. The duration of a fully scaled state in state machine 340 is cache scale times the processor clock periods. For example, if L2 cache 110 is one-third as fast as processor 120, a fully scaled state requires three processor clock periods.

Partially scaled states include states that involve cache access but do not require waiting for the off-chip cache. The duration of a partially scaled state in state machine 340 is no smaller than the setup time of L2 cache 110, and is a multiple of the processor clock period. For example, if L2 cache 110 is one-third as fast as processor 120, a partially scaled state requires two processor clock periods.

To sum up, state machine 340 waits in a unscaled state for the clock period of processor 120 (FIG. 1), waits in a fully scaled state for the clock period of level-2 cache 110, and waits in a partially scaled state for the setup duration required by level-2 cache 110. As the setup duration for a level-2 cache is less than its clock period, state machine 340 in a partially scaled state waits for less time than the time needed in a fully scaled state.

In one particular embodiment, state machine 340 has a number of state machine input lines, including a holdstate line 348, and a number of state machine output terminals, including nextscale terminals 347. State machine 340 transitions to a next state at the next processor clock cycle only if a signal HOLDSTATE (also referred to as a "holdstate signal") is inactive on holdstate line 348. If signal HOLDSTATE is active, then at the next processor clock cycle state machine 340 stays in the current state. Therefore, signal HOLDSTATE must be driven active or inactive as appropriate at least within the last cycle of the current scaled state.

In this particular embodiment, level-2 control unit 300 (FIG. 4) includes a state duration controller 370 having a number of controller input lines, including at least two nextscale input lines 372, and maxscale input lines 371 coupled to a scale register 380. In addition, state duration controller 370 has a number of controller output terminals including terminal 373 (also referred to as a "holdstate output terminal") that is coupled to holdstate line 348. Nextscale input lines 372 are coupled to corresponding nextscale terminals 347 of state machine 340. State machine 340 drives on nextscale terminals 347 one of signals PARTIALLYSCALED and FULLYSCALED (also referred to as nextscale signals) thereby to indicate the scale of the next state.

State duration controller 370 uses a signal MAXSCALE from scale register 380 on maxscale input lines 371 to select a set of durations. State duration controller 370 determines a duration from the selected set corresponding to the next scale indicated on nextscale input lines 372. On completion of the current scaled state, state duration controller 370 drives signal HOLDSTATE active on holdstate output terminal 373 for the determined duration.

For example, if maxscale input lines 371 indicate a maximum scale of three, state duration controller 370 drives signal HOLDSTATE active for (1) one clock period for signal PARTIALLYSCALED (2) two clock periods for signal FULLYSCALED and (3) does not drive signal HOLDSTATE if both signals PARTIALLYSCALED and FULLYSCALED are inactive.

Paritally scaled state machine 340 of this embodiment also has a cache status line 342 coupled to a cache status terminal 337, a cache control line 344 coupled to a cache control terminal 336, and a system control line 345 coupled to a system control terminal 335. Partially scaled state machine 340 also has a latch request line 343 that is coupled to a latch request terminal 354 of an address supply circuit 350 that is also included in level-2 control unit 300. Moreover, partially scaled state machine 340 also has a status line 346 that is coupled to status terminal 338. Status terminal 338 is in turn coupled to level-1 terminals 212 and TLB terminals 211, thereby to indicate status to any portion, e.g. one of storage components 231, 235, 271, 275.

In response to an active latch request signal on latch request terminal 354, address supply circuit 350 supplies a physical address on physical address lines 356 coupled to physical address terminals 334, based on address signals on address input lines 352 coupled to address input terminals 332.

Specifically, address supply circuit 350 selects an address according to the following priority scheme with the highest priority address being listed first: write address from data cache 270, read address from data cache 270, read address from instruction cache 230, translate address from data TLB 275 or translate address from instruction TLB 235. In one particular embodiment, the priority scheme is subordinate to an external snoop signal, from system bus 122 that is processed at the highest priority by level-2 control unit 300. Specifically, partially scaled state machine 340 transitions into a memory housekeeping state on receipt of an external snoop signal in certain states that are described below.

If a translate address is selected for processing, address supply circuit 350 forms a page directory entry address by combining the translate address with a table base address signal on table base address terminals 355 that are coupled to a table base address register, e.g. register CR3. Address supply circuit 350 then supplies the page directory entry address on physical address lines 356, and on receipt of a page directory entry signal on table entry lines 353 that are coupled to table entry terminals 333, address supply circuit 350 automatically forms a page table entry address using the translate address, and supplies the page table entry address at physical address lines 356.

In response to request signals on control request lines 341, state machine 340 transitions through a number of states of the type within ordinary skill in the art in view of the enclosed disclosure. Examples of such states and operations performed in the states are described in U.S. Pat. application Ser. No. -, Attorney Docket No. M-3652_US entitled "A CACHE CONTROLLER WITH TABLE WALK LOGIC TIGHTLY COUPLED TO SECOND LEVEL ACCESS LOGIC" by Puneet Sharma and John G. Favor, incorporated by reference above. States LOOKUPL2RD and LOOKUPL2WR of FIGS. 6A–6B of above referenced U.S. Pat. application, Ser. No. 08/649,847, Attorney Docket No. M-3652_US are illustrated by lookup cache read state machine 500 (FIG. 5A) and lookup cache write state machine 530 (FIG. 5B) respectively.

Although use of partially scaled states in one embodiment is illustrated by lookup cache read state machine 500 (FIG. 5A) and lookup cache write state machine 530 (FIG. 5B) described below, the invention is not limited thereto.

The scale of each state in state machines 500 and 530 is illustrated by use of a prefix, such as "U__", "P__" and "F__" to indicate the time spent in that specific state. For example, if processor 120 is thrice as fast as level-2 cache 110, then prefix "U__" indicates one processor clock period, prefix "F__" indicates three processor clock periods, and prefix "P__" indicates a setup time of two processor clock periods.

State machine 340 waits in an unscaled state (not shown) for a request signal, such as a read access operation for retrieval of a word from the off-chip cache. On receipt of such a request signal, state machine 340 processes the request signal, for example by transitioning to state U_STARTRD (FIG. 5A) of state machine 500.

On entry into state U_STARTRD (FIG. 5A) at time t1 (FIG. 6A), state machine 500 drives signal PARTIALLY-SCALED on nextscale terminal 347A, thereby to indicate that the duration of next state P_ADDRESSSETUP is only two processor clock periods. On the next rising edge of signal PROCESSORCLOCK (also referred to as "processor clock signal") on a state machine clock line 349 (FIG. 4) at time t2 (FIG. 6A), state machine 500 finds signal HOLD-STATE inactive, and transitions via branch 501 to state P_ADDRESSSETUP. Therefore, state machine 500 waits for a single processor clock period (t2–t1), as indicated by prefix "U" in state U_STARTRD.

On entry into state P_ADDRESSSETUP at time t2, state machine 500 drives signal FULLYSCALED on nextscale terminal 347B, thereby to indicate that the duration of next state F_DATAACCESS is three processor clock periods. In the interim, state duration controller 370 drives signal HOLDSTATE active for one processor clock periods starting at time t2.

Therefore, on the next rising edge of signal PROCESSORCLOCK at time t3, state machine 500 finds signal HOLDSTATE active and stays in state P_ADDRESSSETUP, and continues to drive address signals on L2 bus 121. Again, state duration controller 370 drives signal HOLDSTATE inactive one processor clock period before state machine 500 exits from state P_ADDRESSSETUP.

On the next rising edge of signal PROCESSORCLOCK at time t4, state machine 500 finds signal HOLDSTATE inactive, and transitions via branch 502 to state F_DATAACCESS. Therefore, state machine 500 waits in state P_ADDRESSSETUP for only two processor clock periods (t4–t2), as indicated by prefix "P". The two processor clock periods required by partially scaled state P_ADDRESSSETUP to setup an address is less than three clock periods typically used by conventional devices to access a 3× cache (i.e. a cache that is three times slower than the processor).

Referring back to FIGS. 5A and 6A, on entry into state F_DATAACCESS at time t4, state machine 500 does not drive either of signals PARTIALLYSCALED or FULLY-SCALED on nextscale terminal 347A–347B, thereby to indicate that the duration of next state U_DONERD is only one processor clock period. At time t4, state machine 500 drives active on L2 bus 121 the signal OUTPUTENABLE-, an active low signal as indicated by the suffix "-". In the interim, state duration controller 370 drives signal HOLD-STATE active for two processor clock periods starting at time t4.

Therefore, on the next two rising edges of signal PROCESSORCLOCK at times t5 and t6, state machine 500 finds signal HOLDSTATE active and stays in state F_DATAACCESS, and continues to wait for data and tag signals on L2 bus 121. In the interim, state duration controller 370 drives signal HOLDSTATE inactive starting at time t6. Hence, once more, state duration controller 370 drives signal HOLDSTATE inactive at least one processor clock period before state machine 500 exits from state F_DATAACCESS. Starting at time t6, the data and tag signals TAG/DATA become valid on L2 bus 121 and are latched by processor 120 (FIG. 1).

On the next rising edge, at time t7, state machine 500 finds signal HOLDSTATE inactive and transitions via branch 503 to state U_DONERD. Prior to the transition, state machine 500 drives a hit-miss signal HIT/MISS active to indicate that a required word was found in L2 cache 110. Therefore, state machine 500 waits for three processor clock periods (t7–t4), as indicated by prefix "F" in state F_DATAACCESS.

In the above example, state machine 500 waits for a total of five clock periods (two in a partially scaled state and three in a fully scaled state) to perform a read access operation, as compared to a total of six clock periods for a conventional device. So, use of a partially scaled state machine as described herein takes advantage of the smaller setup time required by level-2 cache 110 (as compared to the normal access time) to speed up a read access operation by processor 120. The greater the ratio of the relative frequencies of processor 120 and L2 cache 110, the larger the effect of a partially scaled state machine in improving performance during cache accesses.

Figure 5B:
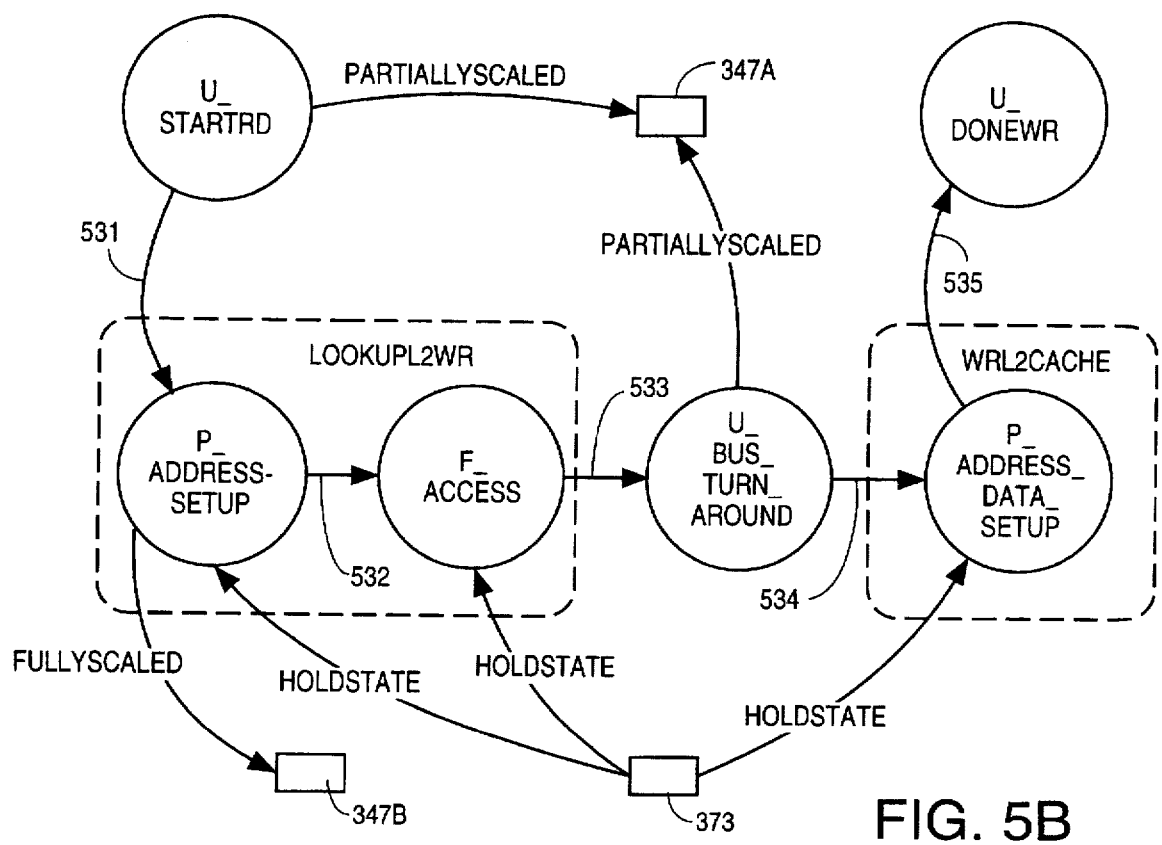
Figure 6A:
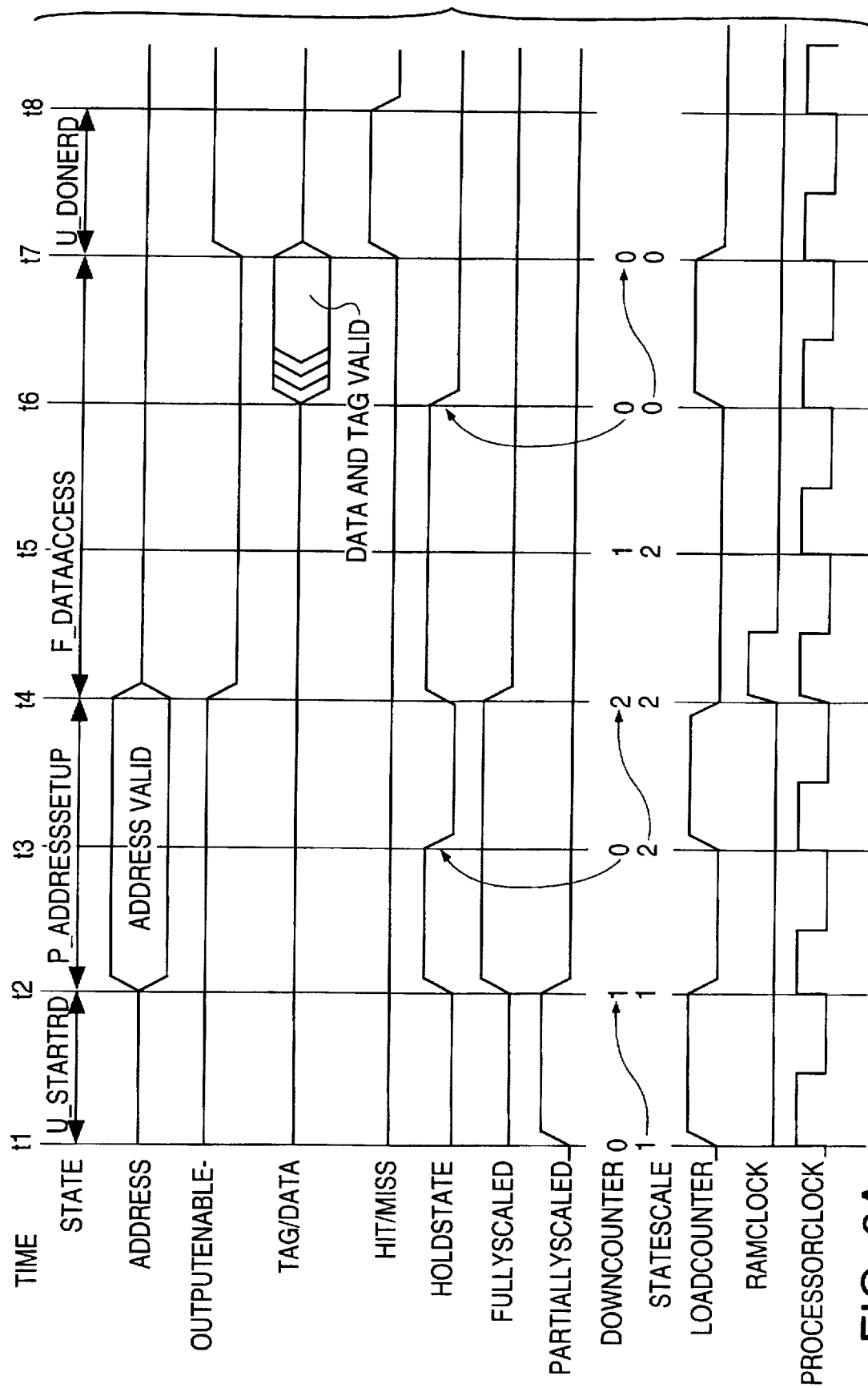
FIGS. 6A–6B and 7A–7B are illustrative timing diagrams for read and write access operations for maximum scales of three and two respectively.
Figure 6B:
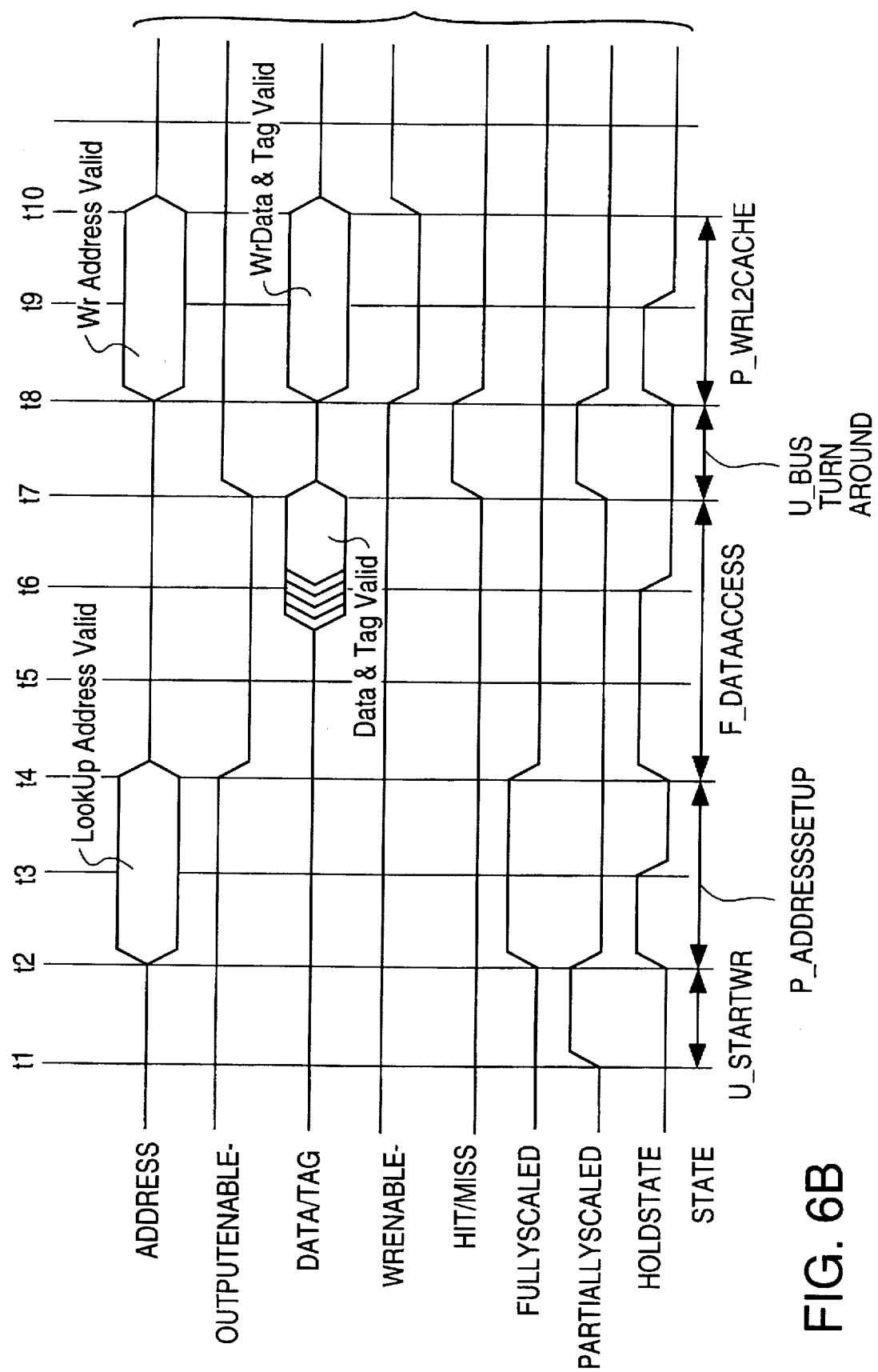

A similar use of scaled states by state machine 340 is illustrated in FIGS. 5B and 6B for a write access operation to L2 cache 110. Specifically, to perform a write access operation, state machine 340 transitions from an unscaled state (not shown) to state U_STARTWR (FIG. 5B) of state machine 530. From state U_STARTWR at time t1 (FIG. 6B), state machine 530 transitions via branch 531 to state P_ADDRESSSETUP (FIG. 5B).

On entry into state P_ADDRESSSETUP (FIG. 5B), state machine 530 drives the address signals on L2 bus 121 for two processor clock periods, for duration t4–t2. Thereafter, state machine 530 transitions via branch 532 to state F_DATAACCESS, and waits for three processor clock periods, for duration t7–t4. During the last clock period t7–t6, state machine 530 latches data and tags from L2 bus 121.

Then, state machine 530 transitions via branch 533 to state U_BUSTURNAROUND, and waits for a single processor clock period. At time t8, state machine 530 transitions via branch 534 to state P_ADDRESSDATASETUP. State machine 530 drives the address, data and tag signals on L2 bus 121 for two processor clock periods, for duration t10–t8, and transitions via branch 535 to unscaled state U_DONEWR.

The unscaled states of state machine 340 and states U_STARTWR, U_DONEWR, U_STARTRD and U_DONEWR can overlap, so that little or no time is lost in starting and ending operations of nested state machines 530 and 500 respectively.

Therefore, in this example, state machine 530 waits for only eight processor clock periods to write a word into an off-chip cache, as compared to twelve clock periods for fully scaled state machine. The fully scaled state machine has four states: ADDRESSSETUP, DATAACCESS, BUSTURN-AROUND and ADDRESSDATASETUP, and requires three processor clock periods for each state.

Although a maximum scale of three is illustrated in FIGS. 6A–6B, other scales can be used in other embodiments. That is, a ratio of level-2 cache cycle time (for synchronous SRAM or synchronous DRAM as level-2 cache) to the processor clock period, called "L2 cache scale," is related to the number of CPU cycle times in each of states with prefix U, P and F as shown in TABLE 1 below:

TABLE 1

| L2 Cache Scale | Number of Processor Clock Periods | | |
|---|---|---|---|
| (MAXSCALE) | U | P | F |
| 1 | 1 | 1 | 1 |
| 2 | 1 | 1 | 2 |
| 3 | 1 | 2 | 3 |
| 4 | 1 | 2 | 4 |
| 10 | 1 | 2 | 10 |
| 20 | 1 | 9 | 20 |

Figure 7A:
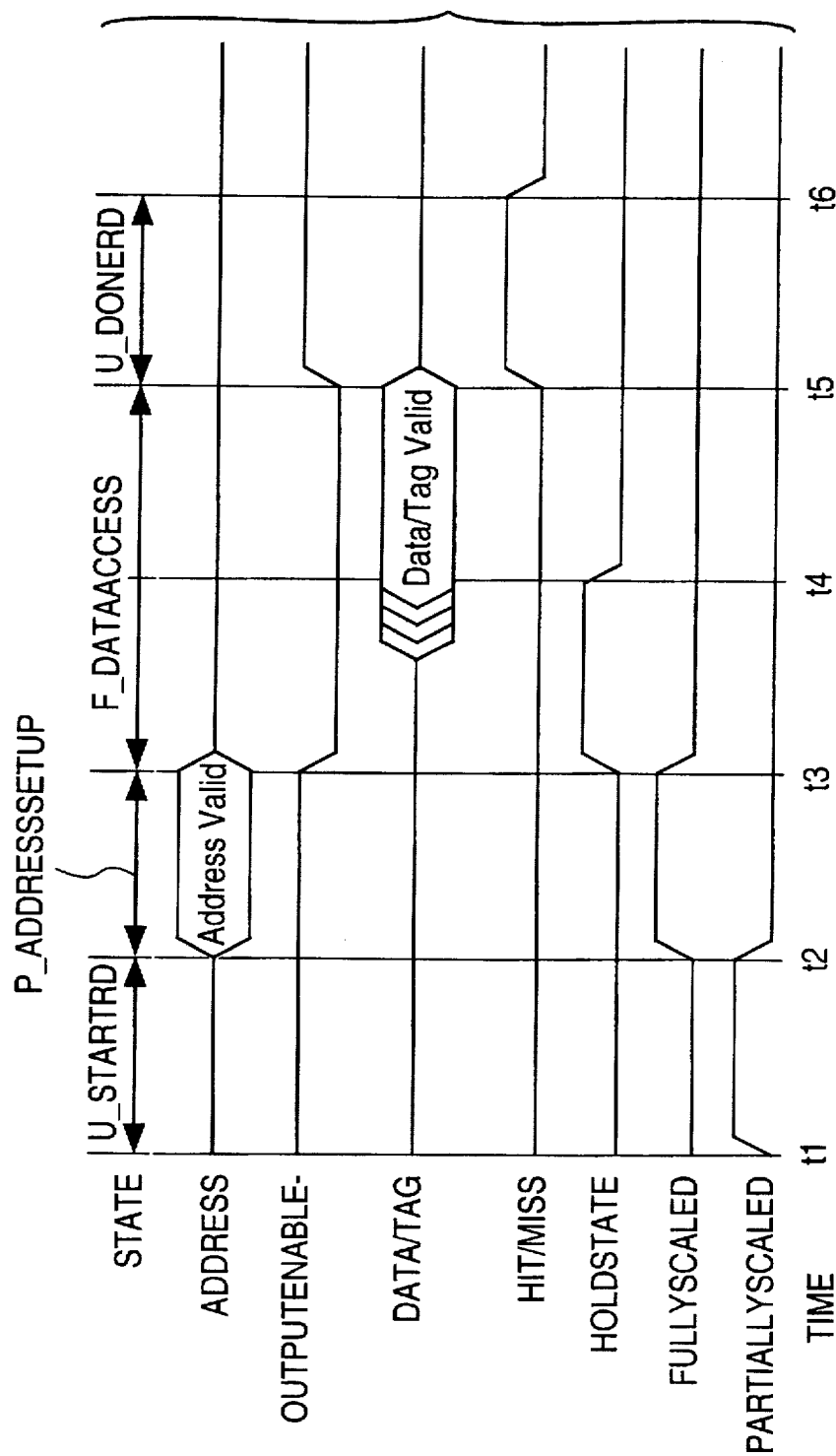
Figure 7B:
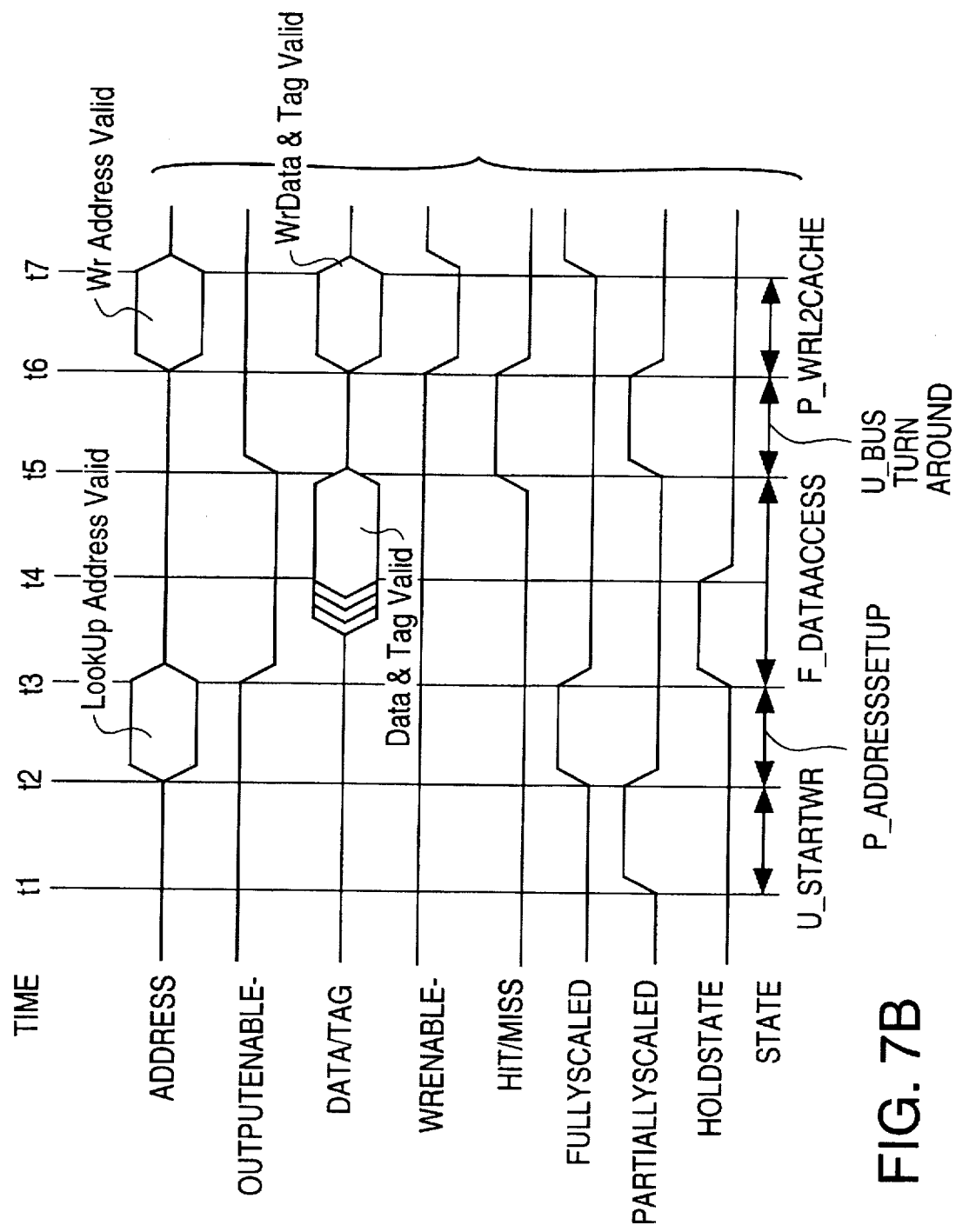

Timing diagrams for L2 cache scale of 2 are illustrated in FIGS. 7A and 7B. As seen in FIG. 7A, a read access operation at scale 2 requires only three processor clock periods, as compared to four processor clock periods for a fully scaled state machine. Moreover, a write access operation at scale 2 requires only five processor clock periods, as compared to eight processor clock periods for a fully scaled state machine.

Although state machines 500 and 530 are described herein for operations to access an off-chip cache, such state machines can be used to perform any other operation that requires waits of different durations in different states, such as operations to access main memory, or operations to access a peripheral device, e.g. a magnetic disk or a network device.

Figure 8:
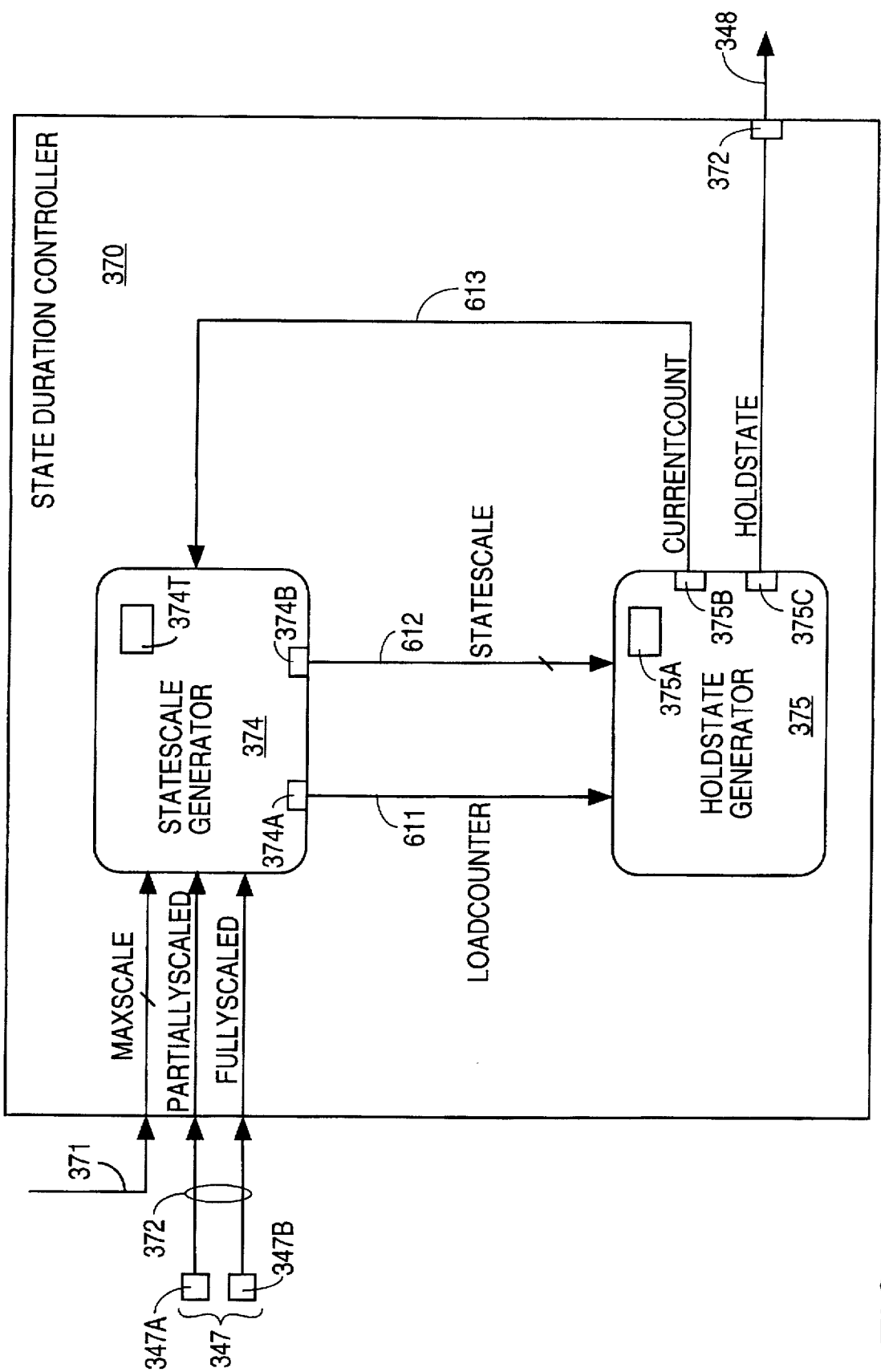
FIG. 8 illustrates in an intermediate level block diagram, the state duration controller of FIG. 4.

In one embodiment, state duration controller 370 (FIG. 8) includes a state scale generator 374 and a holdstate generator 375. State scale generator 374 is coupled to lines 371 and 372. In response to an active signal on one of lines 372, e.g. one of signals PARTIALLYSCALED or FULLYSCALED, statescale generator 374 drives a signal LOADCOUNTER active on a terminal 374A that is coupled to an input line 611 of holdstate generator 375. In response to an active signal LOADCOUNTER, holdstate generator 375 loads into a down counter 375A, a signal STATESCALE from lines 612. Lines 612 are coupled to terminals 374B of statescale generator 374.

Statescale generator 374 drives signal STATESCALE in dependence on a maximum scale, as indicated by signal MAXSCALE on line 371, and the type of the next state, as indicated by signals FULLYSCALED and PARTIALLYSCALED, using, for example, TABLE 1. That is, in one embodiment, statescale generator 374 has storage elements 374T that hold the scale values in TABLE 1 for the three types of scaled states for different maximum scale values. Holdstate generator 375 drives signal HOLDSTATE on terminal 375C active as long as the signal stored in downcounter 375A is greater than 0.

As soon as the signal stored in downcounter 375A becomes 0, holdstate generator 375 drives signal HOLDSTATE inactive. Holdstate generator 375 also drives a signal CURRENTCOUNT from down counter 375A on to terminals 375B that are coupled by currentcount input lines 613 of statescale generator 374. Statescale generator 374 samples signals on nextscale input lines 372 whenever signal CURRENTCOUNT is 0.

As an example, when signal PARTIALLYSCALED goes active at time t1 (FIG. 6A), statescale generator 374 drives signal LOADCOUNTER active, and drives signal STATESCALE to the value 1. At time t2, holdstate generator 375 loads value 1 from lines 612 into downcounter 375A, and drives signal HOLDSTATE active. Also at time t2, statescale generator 374 drives signal LOADCOUNTER inactive.

At time t3, down counter 375A decrements the stored signal to 0, and causes holdstate generator 375 to drive signal HOLDSTATE inactive. Also at time t3, statescale generator drives signal LOADCOUNTER active, and drives signal STATESCALE to the value 2.

At time t4, holdstate generator 375 loads value 2 from lines 612 into downcounter 375A, and drives signal HOLDSTATE active. Also at time t4, statescale generator 374 drives signal LOADCOUNTER inactive.

At time t5, down counter 375A decrements the stored signal to 1, and holdstate generator 375 continues to drive signal HOLDSTATE active. At time t6, down counter 375A decrements the stored signal to 0, and causes holdstate generator 375 to drive signal HOLDSTATE inactive. At time t6, in an optional step, statescale generator drives signal LOADCOUNTER active and signal STATESCALE to the value 0. Thereafter, signal HOLDSTATE remains inactive at times t7 and t8, indicating that state machine 500 is in unscaled states.

Processor 120 (FIG. 1) receives a signal MAXSCALE at two external terminals 123 and 124 accessible from a region outside processor 120. Processor 120 stores the received signal in scale register 380 at startup. Signal MAXSCALE used by statescale generator 374 can be changed after startup to any scale necessary to access a peripheral. That is, the scales and the related durations for each scaled state of a partially scaled state machine can be changed dynamically, e.g. by driving a new maximum scale signal on lines 381, while processor 120 is running, to allow access to peripherals having a variety of speeds.

Although a partially scaled state machine has been described herein as having three types of states including a partially scaled state, another embodiment of the state machine has only unscaled states and fully scaled states. In yet another embodiment, a state machine has four types of scaled states: unscaled states, fully scaled states, first partially scaled states and second partially scaled states.

Numerous modifications and adaptations of the described embodiments are apparent to a person of skill in the art in view of the enclosed disclosure. Various such modifications and adaptations are covered by the attached claims.

We claim:

1. An integrated circuit comprising:
   a state machine having an state machine input line, a state machine clock line and a plurality of state machine output terminals, said state machine having a plurality of states, each state in said plurality being one of three types of states, a first scaled state, a second scaled state and an unscaled state;
   wherein said state machine transitions from a current state of said plurality to a next state of said plurality in response to a clock signal on said state machine clock line if a first signal on said state machine input line is inactive,
   wherein said state machine stays in said current state in response to said clock signal if said first signal is active, wherein said state machine drives a second signal on said state machine output terminals on entry into said current state, said second signal being indicative of a duration of said state machine in said next state, and wherein a first duration in a first scaled state is larger than a second duration in a second scaled state, and said first duration is a multiple of a third duration in an unscaled state.

2. The integrated circuit of claim 1 further comprising:

a controller having a plurality of controller input lines, and a controller output terminal, said controller input lines being coupled to said state machine output terminals and said controller output terminal being coupled to said state machine input line, wherein said controller drives said first signal on said controller output line for a duration selected from a group consisting of said first duration, said second duration and said third duration in dependence on said second signal.

3. The integrated circuit of claim 1 wherein said controller has a plurality of maximum scale lines, and said controller determines said first duration and said second duration in dependence on a maximum scale signal on said maximum scale lines.

4. The integrated circuit of claim 3 further comprising a plurality of external terminals and a storage element coupled to said maximum scale lines, and wherein said integrated circuit stores a signal from said external terminals in said storage element at startup of said integrated circuit.

5. The integrated circuit of claim 1, wherein said state machine has a number of request lines, and said state machine has at least a first unscaled state, a second unscaled state, a partially scaled state and a fully scaled state, further wherein in response to an active signal on one of said request lines, said state machine performs an operation by transition from said first unscaled state to said partially scaled state, transition from said partially scaled state to said fully scaled state and transition from said fully scaled state to said second unscaled state.

6. The integrated circuit of claim 1, wherein said state machine has a number of request lines, and said state machine has at least a first unscaled state, a second unscaled state and a partially scaled state, further wherein said state machine performs at least a portion of an operation by transition from said first unscaled state to said partially scaled state and transition from said partially scaled state to said second unscaled state.

7. In a computer system having a processor and memory addressable by said processor, said memory being capable of storing a plurality of words, said memory including at least a first level cache, a second level cache and a main memory, said first level cache being inside said processor, said second level cache and said main memory being outside said processor, a second level control unit having a plurality of physical address terminals, said second level control unit including:

a state machine having an state machine input line, a state machine clock line and a plurality of state machine output terminals, said state machine having a plurality of states, each state in said plurality being one of three types of states, a first scaled state, a second scaled state and an unscaled state;

wherein said state machine transitions from a current state of said plurality to a next state of said plurality in response to a clock signal on said state machine clock line if a first signal on said state machine input line is inactive, wherein said state machine stays in said current state in response to said clock signal if said first signal is active, wherein said state machine drives a second signal on said state machine output terminals on entry into said current state, said second signal being indicative of a duration of said state machine in said next state, and wherein a first duration in a first scaled state is larger than a second duration in a second scaled state, and said first duration is a multiple of a third duration in an unscaled state;

wherein said second level control unit uses said state machine to drive an address on said physical address signals to said second level cache.

8. The second level control unit of claim 7, wherein said state machine is used to access said main memory.

9. A method for operating a state machine in an integrated circuit, said state machine having an input line and a plurality of output terminals, said state machine having a plurality of states, each state in said plurality being one of three types of states, a first scaled state, a second scaled state and an unscaled state, said method comprising:

transitioning said state machine from a current state to a next state in response to a clock signal if a first signal on said input line is inactive, keeping said state machine in said current state in response to said clock signal if said first signal is active, driving a second signal on said output terminals on entry into said current state, said second signal being indicative of a duration of said state machine in said next state, wherein a first duration of said state machine in a first scaled state is larger than a second duration in a second scaled state, and said first duration is a multiple of a third duration in an unscaled state.

10. The method of claim 9 wherein said state machine has at least a first unscaled state, a second unscaled state, a partially scaled state and a fully scaled state, said method comprising:

performing an operation by transition from said first unscaled state to said partially scaled state, transition from said partially scaled state to said fully scaled state and transition from said fully scaled state to said second unscaled state.

\* \* \* \* \*